No. 766,893. Patented August 9, 1904.

UNITED STATES PATENT OFFICE.

FRANZ OLIVA, OF MALSTATT-BURBACH, GERMANY.

PROCESS OF MANUFACTURING ARTIFICIAL MARBLE.

SPECIFICATION forming part of Letters Patent No. 766,893, dated August 9, 1904.

Application filed April 8, 1902. Serial No. 101,941. (No specimens.)

*To all whom it may concern:*

Be it known that I, FRANZ OLIVA, a subject of the Emperor of Austria-Hungary, residing at Malstatt-Burbach, Kingdom of Prussia, German Empire, have invented a certain new and useful Process for the Manufacture of Artificial Marble, of which the following is a specification.

This invention has reference to a process for manufacturing artificial marble of any desired coloration and of plates, objects of art, and the like from the product thus obtained.

The process is based upon the property of burnt sulfate of alumina and gypsum to combine with water, the reaction being accompanied by the generation of a rather considerable heat, whereby a hard mass of stone-like appearance is produced.

For carrying out the process of my invention I make use of the mixture known as "marble cement" in the trade and consisting of varying proportions of burnt sulfate of alumina with burnt gypsum. In place of the latter I may also use the mineral known as "anhydrite." Other cements are not applicable in my process on account of their failing to possess the pure whiteness required for the imitation of natural marble.

The process is carried out by first stirring up the marble cement in finely-divided condition with water, so as to form a stiff paste, which is then spread upon a table. I may sometimes also add a new quantity of marble cement in order to give to the paste the consistency of a dough, which may be kneaded and shaped in any desired manner. The thus-obtained plastic mass is divided up into several small pieces, and upon these the dry coloring-matter, which may be mixed with marble cement also, is spread by sifting or otherwise in order to produce the peculiar veins. The powdered coloring-matter covers the several pieces and fills the interstices between them, and in this manner I am able to produce the continuous veins by kneading together the thus-obtained mass. No thorough kneading or mixing takes place, however, the kneading being only sufficient to press the particles together, so as to make them adhere to each other and to change their relative position in the body part of the marble and to produce a broken appearance of the veins. In order to produce veins of different color, the dough is divided up into pieces, as usual, and powdered coloring-matter of different colors is then sifted upon it. In order to imitate the grainy appearance of the particles of marble and to prevent the color from spreading sidewise and from becoming blended with the adjoining parts of the marble compound, it is essential to use the coloring-matter in a dry condition and not in a liquid state. Besides, the use of color in form of a liquid has the disadvantage of introducing an undue amount of water into the preparation, which it is difficult to remove by squeezing or otherwise. The presence of water in the coloring-matter destroys the proper consistency of the marble compounds, and in view of the subdivided parts of the dough-like compound being only united by being pressed together in my invention and not by a thorough kneading process the presence of water in the veins will prevent the drying of the preparation, and if left to remain after the body part of the artificial marble has solidified the water by expansion will cause fissures and cracks and ready breaking apart of the imitation marble produced.

In order to produce colored marble—for instance, an imitation of the precious yellow marble Giallo Antico, and the like—the dough which forms the base for the manufacture of the marble is mixed with a suitable coloring agent. If the thus-produced artificial marble is to show different colors or a kind of mosaic-like pattern, I proceed by dividing the dough into several sections and mixing each section with the different colors, the whole being then either united by kneading, or I may produce a more intimate blending of the colors by filling the dough into molds and submitting the contents of such molds to the action of high pressure. It is obvious that I may also provide the product thus obtained with veins in the manner heretofore described. In the manufacture of differently-colored plates it is preferable to fill the raw material in a dry condition into the mold after having previously added the necessary colors, whereupon the material in the dry molds is covered with the mixture of moistened raw material. By then submitting the contents of the molds to a high pressure, as above outlined, it is possible to produce the grain-like structure peculiar to natural marble. The pressure may be produced by any suitable press or in any other suitable manner.

According to the process forming the subject of this invention I am able to produce objects of art of any desired shape, inasmuch as the dough may be made to assume any desired form. After twenty-four hours the previously shaped or pressed mass, plates, objects, or the like have become sufficiently solid to allow of being treated with a rasp or the like to take off any rough unevenness, any remaining pores or fissures being filled up. After another twenty-four hours the objects have become perfectly hard, and they may then be ground and polished with pumice-stone, freestone, slate, or with any other suitable material in order to acquire a marble-like polish. By a suitable treatment a high gloss may even be imparted to the plates or to any other objects produced from the plastic mass.

What I claim, and desire to secure by Letters Patent of the United States, is—

1. The process of manufacturing artificial veined marble which consists in intimately mixing anhydrous sulfate of alumina and anhydrous sulfate of lime, adding water to the mixture of the two materials to convert it into a stiff plastic mass, subdividing the entire mass into any suitable number of separate parts, arranging the said parts in any desired manner, sprinkling dry coloring-matter over and between the said parts, and then pressing the parts together without substantial mixture.

2. The process for manufacturing artificial veined marble from a substantially pure mixture of anhydrous sulfate of alumina and anhydrous gypsum which consists in adding water and any suitable coloring agent to the mixture, kneading and forming the mixture into a stiff plastic dough, subdividing said dough into any number of parts of different configuration arranging said parts at small distances from each other, distributing dry coloring-matter over and between the said parts and reuniting, blending together and suitably molding and shaping the resultant product.

3. The process of manufacturing artificial veined marble from a substantially pure mixture of anhydrous sulfate of alumina and anhydrous sulfate of lime which consists in incorporating a sufficiency of water with said mixture to form a stiff solid plastic dough, subjecting the entire dough to subdivision into irregularly-shaped sold plastic parts, arranging said parts side by side and at small distances from each other, sprinkling dry coloring-matter over and between the parts and reuniting and blending together the said parts without substantial mixture, and suitably molding, shaping and drying the resultant product.

In witness whereof I have hereunto signed my name in the presence of two subscribing witnesses.

FRANZ OLIVA.

Witnesses:
JEAN GRUND,
CARL GRUND.